(12) United States Patent
Maruyama et al.

(10) Patent No.: US 6,425,819 B2
(45) Date of Patent: Jul. 30, 2002

(54) AIR CONDITIONER WITH ROTARY DOOR AND FILTER

(75) Inventors: Miyuki Maruyama, Kariya; Hirotaka Chishiki, Anjo; Takahiro Tokunaga, Kosai; Kenji Matsui, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/912,978

(22) Filed: Jul. 25, 2001

(30) Foreign Application Priority Data

Jul. 26, 2000 (JP) ........................................ 2000-225770

(51) Int. Cl.[7] ................................................ B60H 3/06
(52) U.S. Cl. ........................... 454/139; 55/422; 55/471; 454/158
(58) Field of Search ................................. 454/139, 158; 55/422, 471, 385.3, 509

(56) References Cited

U.S. PATENT DOCUMENTS 5,277,704 A * 1/1994 Miller et al. ................... 55/321
5,433,663 A * 7/1995 Henningsson et al. ......... 454/358
5,643,079 A 7/1997 Miyata et al. ................. 454/139
5,848,964 A * 12/1998 Samuels et al. ............... 600/200

FOREIGN PATENT DOCUMENTS

| GB | 9834 | * of 1902 | ................... 55/422 |
| JP | A-9-188124 | 7/1997 | |

* cited by examiner

*Primary Examiner*—Harold Joyce
(74) *Attorney, Agent, or Firm*—Harness, Dickey & Pierce, PLC

(57) ABSTRACT

In an air conditioner, filter deformation strings are disposed on an outer surface side of a bent portion of a filter, so that the bent portion of the filter is crushed when a predetermined tension is applied to the strings. When the strings are drawn, the bent portion of the filter is deformed to a plate like, and the filter can be readily removed from a casing through a filter-removable port of the casing. On the other hand, when the filter is attached into the casing, the deformed plate-like filter is inserted into the casing from the filter-removable port while drawing the strings, and thereafter, the strings are loosened so that the shape of the filter returns to an original shape.

13 Claims, 6 Drawing Sheets

AIR CONDITIONER WITH ROTARY DOOR AND FILTER

BACKGROUND OF THE INVENTION

1. Field of the Invention

The present invention relates to an air conditioner having a filter, and a rotary door for opening and closing an air opening through which air flows. The present invention is suitably used for an inside/outside air switching unit of a vehicle air conditioner.

2. Description of Related Art

In a conventional inside/outside air switching unit using a rotary door described in U.S. Pat. No. 5,643,079, a filter is bent to protrude toward an inside air introduction port and an outside air introduction port, so that a filter area can be increased without increasing an air passage sectional area. Because the filter is for removing dust contained in air, it is necessary to change or clean the filter periodically. However, because the filter is bent, the bent portion of the filter is interfered with an inner wall of a casing when the filter is detached, and detaching performance is deteriorated.

To overcome this problem, the filter may be disposed to be separated from the inner wall of the casing by a sufficient space. However, in this case, the size of the inside/outside air switching unit becomes larger.

SUMMARY OF THE INVENTION

In view of the foregoing problems, it is an object of the present invention to provide an air conditioner in which an attaching/detaching performance of the filter is improved while a size of the air conditioner can be reduced.

According to the present invention, an air conditioner includes a casing having an air opening through which air flows, a rotary door for opening and closing the air opening, and a filter for cleaning air. The rotary door has both rotation shafts at both sides in an axial direction of the rotary door, and a door surface disposed at a position away from the rotation shafts by a predetermined dimension in a radial direction of the rotary door to be crossed with the radial direction. In addition, the filter is detachably disposed inside the door surface, and has a bent portion protruding toward the door surface. In the air conditioner, the casing has a filter-removable port through which the filter is detachably attached into the casing, and the filter has a filter deformation member which is disposed to deform the bent portion of the filter to a flat shape. Because the filter can be deformed to the flat shape, the filter can be readily removed from the filter-removable port of the casing. Accordingly, a filter area can be increased by bending the filter, and the size of the air conditioner can be reduced while attaching/detaching performance of the filter is improved. Preferably, the filter deformation member is a string-shaped member which is disposed to crush the bent portion when a predetermined tension is applied thereto. Accordingly, while the filter is attached into or detached from the casing, the filter can be deformed to the flat shape with a simple structure. On the other hand, after the filter is attached into the casing through the filter-removable port, the tension applied to the string-shaped member is loosened, so that an original shape of the filter can be substantially returned.

More preferably, the bent portion is constructed by a corrugated filter element formed into a wave shape, and the string-shaped member is disposed to cross ridges of the corrugated filter element on the bent portion. Therefore, the bent portion can be readily deformed by a small tension of the string-shaped member.

The filter further has a flat pedestal portion for fixing the bent portion, a part of the pedestal portion is bent to form a cover member for opening and closing the filter-removable port, one end of the string-shaped member is disposed to be fixed to the pedestal portion at a side opposite to the cover member, and the other end of the string-shaped member is disposed to be fixed to the cover member. Accordingly, when the cover member opens the filter-removable port of the casing, the string-shaped member crushes the bent portion. On the other hand, when the cover member closes the filter-removable port of the casing, the bent portion substantially returns to an original shape before being crushed. Accordingly, the deformation operation of the bent portion of the filter can be made simple, and the attaching/detaching performance of the filter can be further improved.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
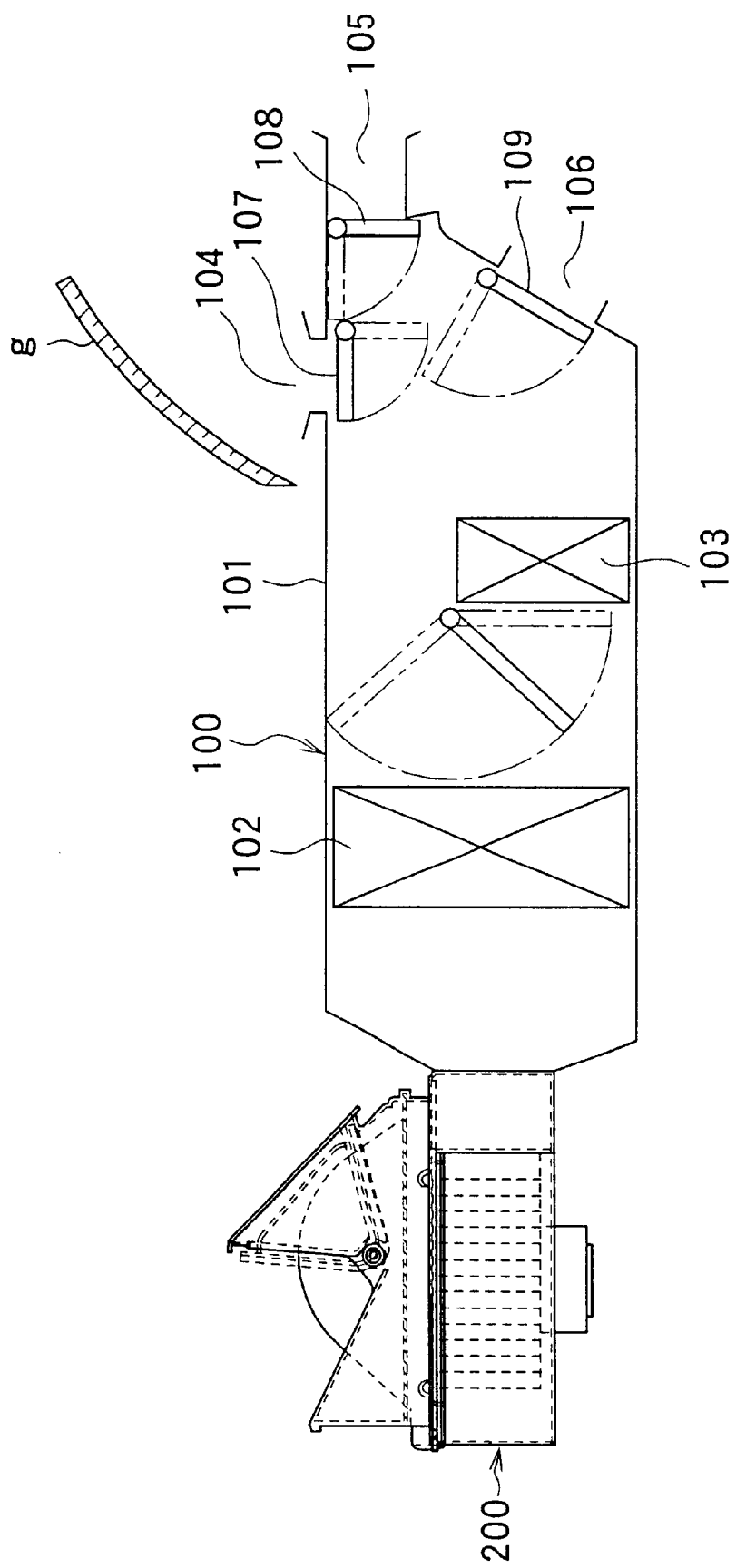
FIG. 1 is a schematic view showing a vehicle air conditioner according to a first preferred embodiment of the present invention.

A first preferred embodiment of the present invention will be now described with reference to FIGS. 1–8. In the first embodiment, the present invention is typically used for a vehicle air conditioner. As shown in FIG. 1, a vehicle air conditioner includes an air conditioning unit 100 for adjusting temperature and humidity of air blown into a passenger compartment, and a blower unit 200 for selectively introducing inside air inside the passenger compartment or outside air outside the passenger compartment and for blowing the introduced air into the air conditioning unit 100.

The air conditioning unit 100 includes an air conditioning case 101 for defining an air passage through which air flows, a cooling heat exchanger 102 for cooling air flowing within the air conditioning case 101, a heating heat exchanger 103 for heating air flowing within the air conditioning case 101, an air mixing door for adjusting an air amount passing through the heating heat exchanger 103 to adjust temperature of air blown into the passenger compartment, and mode switching doors 107, 108, 109 for selectively opening and closing air openings 104–106 to set an air outlet mode. The air openings 104–106 are provided so that air is blown into the passenger compartment through the air openings 104–106.

The air opening 104 is a defroster opening through which air is blown toward an inner surface of a windshield "g" of the vehicle, the air opening 105 is a face opening through which air is blown toward the upper side of a passenger, and the air opening 106 is a foot opening through which air is blown toward the lower area of the passenger.

Figure 2:
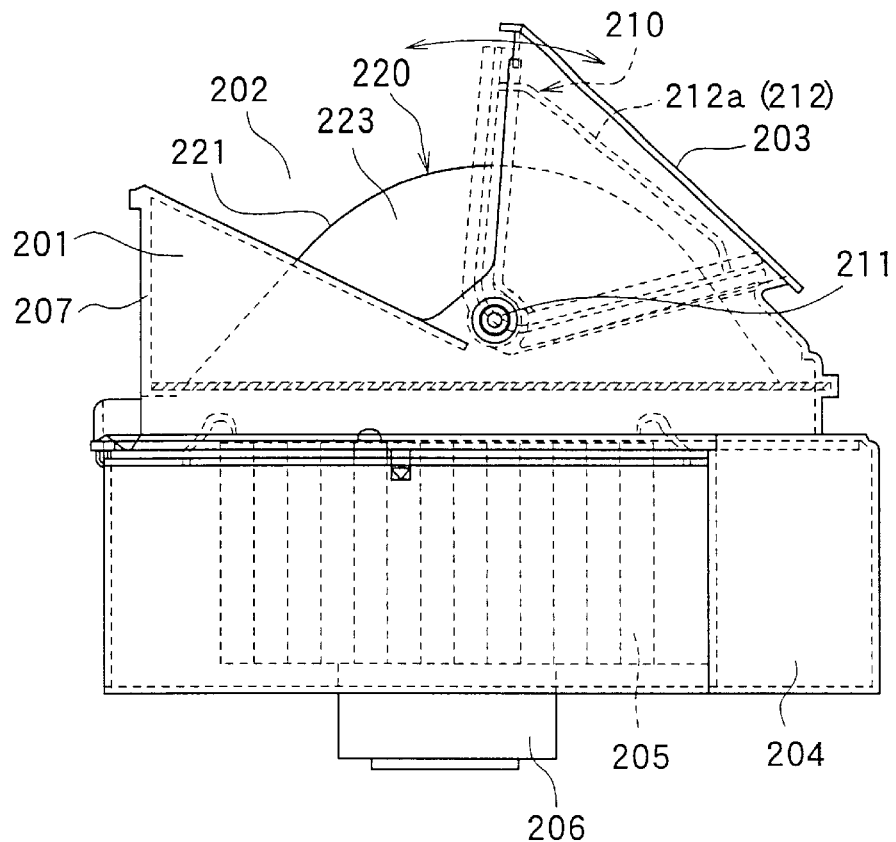
FIG. 2 is a schematic view showing a blower unit according to the first embodiment.
Figure 3:
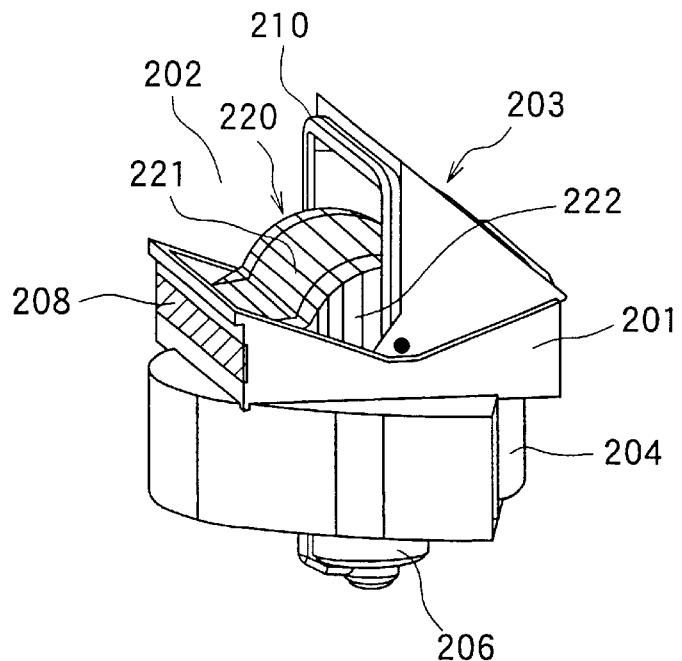
FIG. 3 is a perspective view showing the blower unit according to the first embodiment.

As shown in FIGS. 2 and 3, the blower unit 200 includes an inside/outside air switching casing 201, and a scroll casing 204 disposed at a lower side of the casing 201. The casing 201 has an inside air introduction port 202 from which inside air is introduced, and an outside air introduction port 203 from which outside air is introduced. A centrifugal fan 205 is disposed in the scroll casing 204 formed into a scroll shape. The centrifugal fan 205 is driven and rotated by an electrical motor 206.

Figure 4:
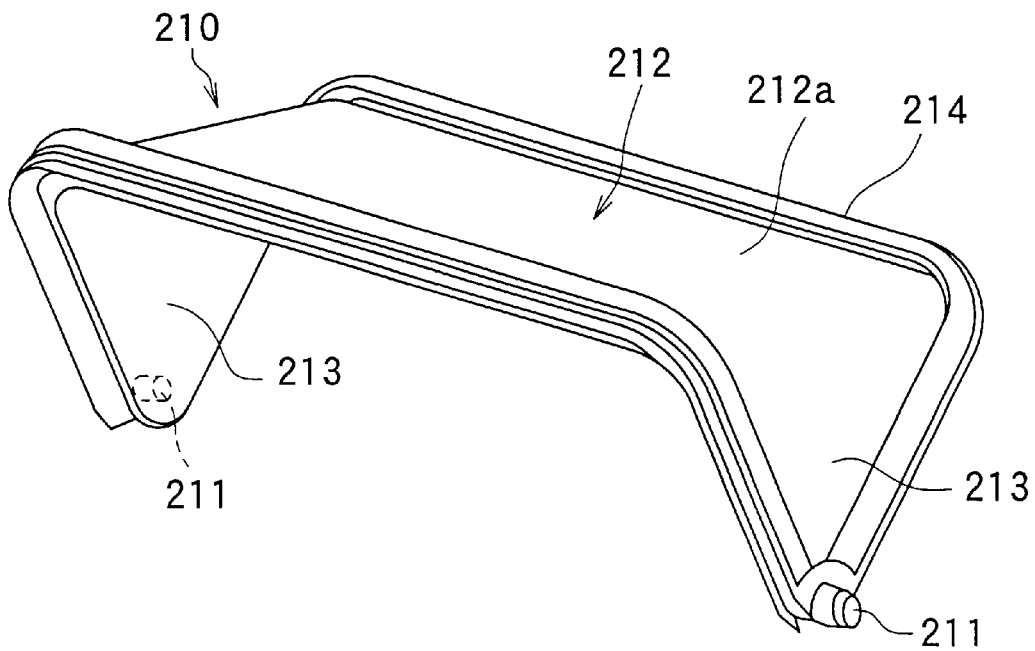
FIG. 4 is a perspective view showing a rotary door used in the blower unit according to the first embodiment.
Figure 5:
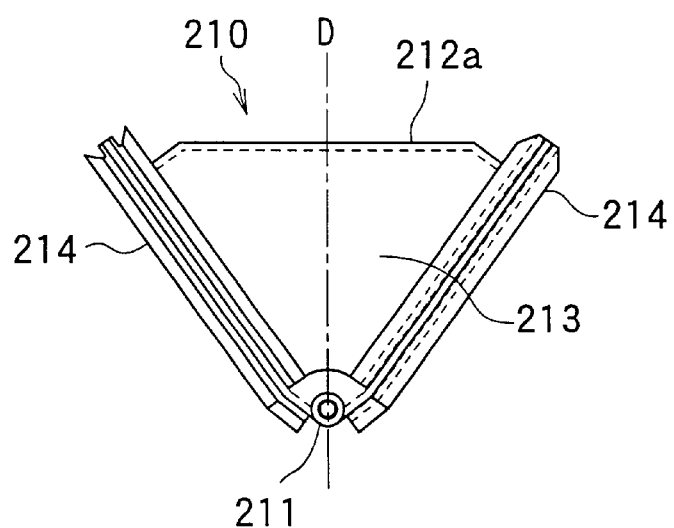
FIG. 5 is a side view when being viewed from a side of FIG. 4.

A rotary door 210 for selectively opening and closing the inside air introduction port 202 and the outside air introduction port 203 is disposed in the casing 201. As shown in FIGS. 4 and 5, the rotary door 210 includes both rotation shafts 211 disposed at both sides in an axial direction of the rotary door 210, a first door portion 212 having a door surface 212*a* approximately perpendicular to a radial direction D at a position away from the rotation shafts 211 by a predetermined dimension in the radial direction D, and both second door portions 213 each of which is formed into an approximate triangular shape to connect the first door 212 and the rotation shafts 21. The rotary door 210 is formed into a gate like, and the first and second door portions 212, 213 of the rotary door 210 are integrally molded by using a resin material. A lip seal 214 made of rubber is attached to outer peripheral ends of the first and second door portions 211, 213, for preventing an air leakage from a clearance between the rotary door 210 and the casing 201.

Figure 6A:
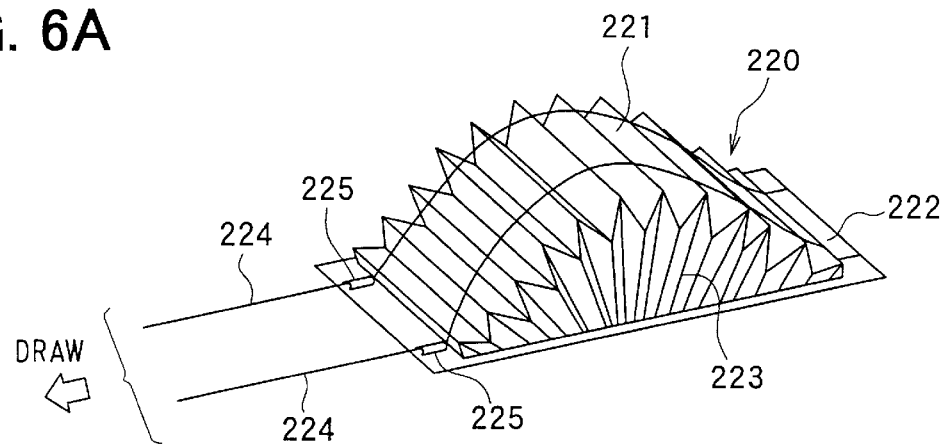
FIG. 6A is a perspective view showing a filter before crushing.

A filter 220 for removing dust contained in air and for cleaning air introduced from the air ports 202, 203 is disposed between both the rotation shafts 211 at an inner side from the door surface 212*a* of the first door portion 212. The filter 220 is made of polyester. As shown in FIGS. 2 and 6A, the filter 220 is bent to protrude toward the door surface 212*a* of the rotary door 210. That is, the filter 220 is formed into a semicylindrical shape composed of a bent portion 221 bent along a rotation direction of the rotary door 220, a rectangular flange-like pedestal portion 222 for fixing the bent portion 221, and semicircular side plates 223 connecting the pedestal portion 222 and the bent portion 221.

In the first embodiment, each of the bent portion 221 and the side plates 223 is made of a corrugated filter element formed into a wave shape to have plural ridges, for increasing cleaning capacity of the filter 220. Accordingly, in the first embodiment, the above-described semi-cylindrical shape and the above-described bent shape of the filter 220 are expressions when being macroscopically viewed.

Figure 6B:
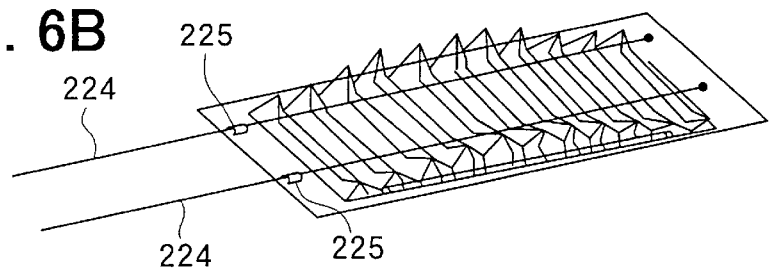
FIG. 6B is a perspective view showing the filter after crushing.

Filter deformation strings 224 (filter deformation member) for deforming the filter 220 are disposed. When a predetermined tension is applied to the filter deformation strings 224, the filter deformation strings 224 crush the bent portion 221 of the semicylindrical filter 220 so that the filter 220 is deformed to a flat shape (plate like) as shown in FIG. 6B.

Further, pipe-like engagement members 225 are provided on the pedestal portion 222 so that the filter deformation strings 224 are movable relative to the pedestal portion 222 and are engaged with the pedestal portion 222 through the pipe-like engagement members 225. One end of each filter deformation string 224 is fixed to the pedestal portion 222 at a side opposite to the engagement members 225.

Figure 7:
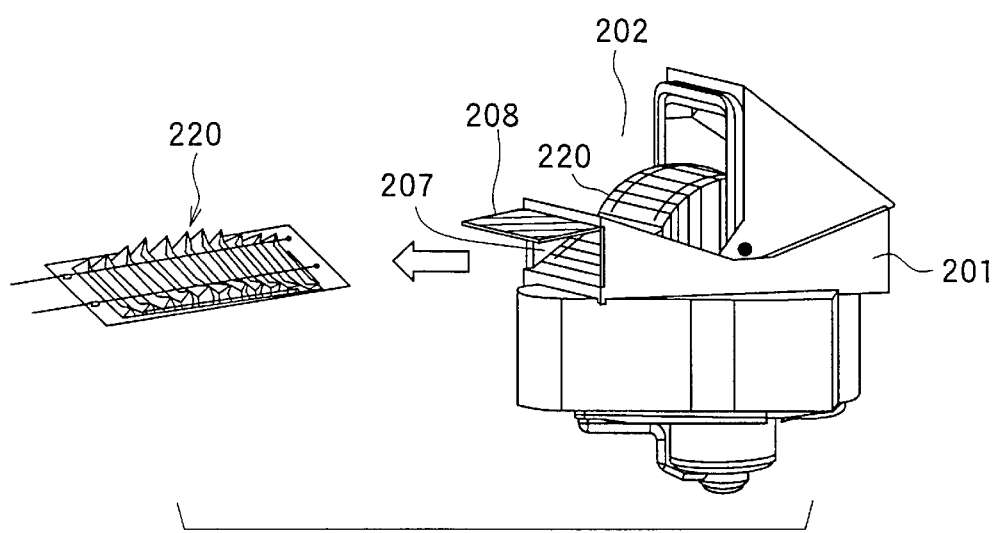
FIG. 7 is a schematic perspective view of the blower unit, for explaining a detaching operation of the filter from a filter-removable port, according to the first embodiment.

As shown in FIG. 7, a filter-removable port 207, for inserting and removing the filter 220 when the filter is attached to or detached from the casing 201, is provided in the casing 202 at a position adjacent to the inside air introduction port 202. The filter-removable port 207 is closed by a filter cover 208 provided in the casing 201.

In the first embodiment, the filter cover 208 and the casing 201 are integrally formed by using resin. A connection portion connecting the filter cover 208 and the casing 201 has a thin thickness thinner than that of the filter cover 208 and the casing 201. That is, a hinge structure is provided in the connection portion connecting the filter cover 208 and the casing 201.

Figure 8A:
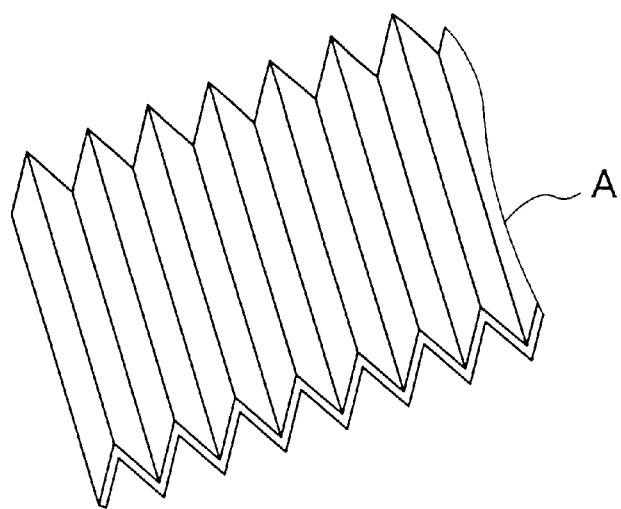
FIGS. 8A, 8B and 8C are views for explaining a manufacturing method of a filter used in the blower unit according to the first embodiment.
Figure 8B:
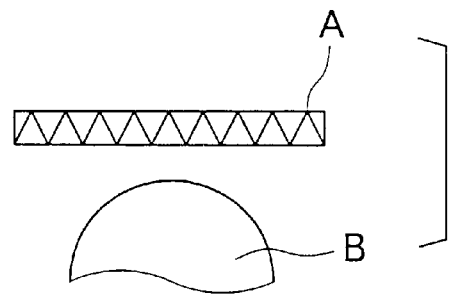
Figure 8C:
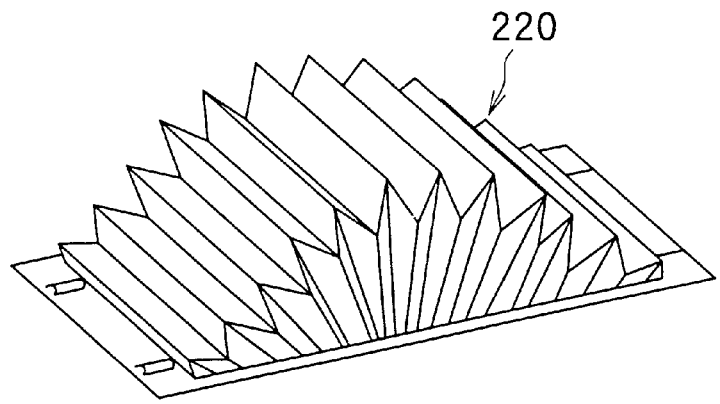

A manufacturing method for manufacturing the filter 220 will be simply described. A wave-shaped plate like filter element A shown in FIG. 8A is press-formed by a semicylindrical (dome shape) die B while being heated, as shown in FIG. 8B. Thereafter, as shown in FIG. 8C, an outer peripheral portion of the filter element A is crushed to form the pedestal portion, while the bent portion 221 and the side plate portions 223 are formed.

According to the first embodiment of the present invention, as shown in FIG. 6A, the filter deformation strings 224 contact the outer surface of the bent portion 221. That is, the filter deformation strings 224 contact plural ridges of the wave-shaped filter element A at an outer side of the bent portion 221, while crossing with the ridges of the wave-shaped filter element A. Here, the outside of the bent portion 221 means an opposite side opposite to a center side of the bent portion 221, and the inside of the bent portion 221 means the center side of the bent portion. Accordingly, the filter 220 can be readily deformed by using the filter deformation strings 224.

Further, in the first embodiment of the present invention, by drawing the filter deformation strings 224 as shown in FIG. 6A, the filter 220 can be readily deformed to the flat shape as shown in FIG. 6B. Therefore, as shown in FIG. 7, the deformed plate-like filter 220 can be readily removed from the filter-removable port 207 of the casing 201.

Further, when the filter 220 is attached into the casing 220 through the filter-removable port 207, the filter deformation strings 224 are drawn (pulled) so that the filter 220 is deformed to be crushed to a plate like, and then the deformed plate-like filter 220 is inserted into the casing 201 from the filter-removable port 207. Thereafter, the filter deformation strings 224 are loosened, so that the shape of the filter 220 is substantially returned to the semicylindrical shape (dome shape) within the casing 201.

Thus, in the first embodiment, the filter area can be increased by bending the filter 220. Accordingly, the filter performance of the filter 220 can be improved while the size of the air conditioner (blower unit 200) can be reduced, and the attaching/detaching performance of the filter 220 is improved.

Figure 9:
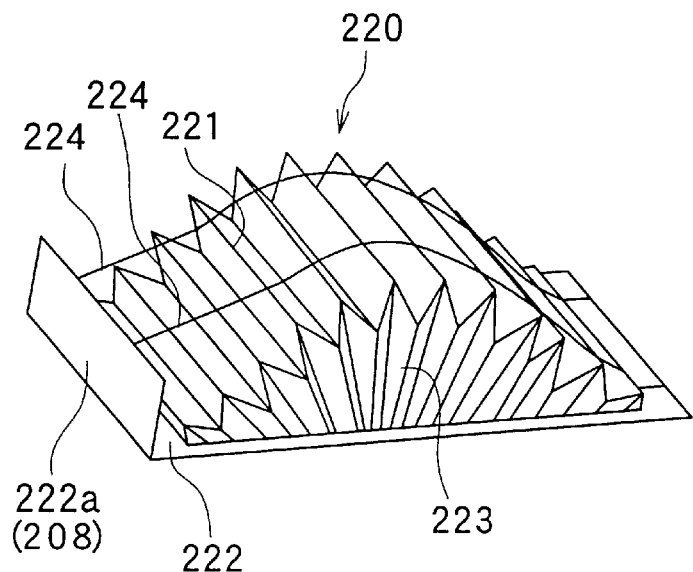
FIG. 9 is a perspective view showing a filter before crushing, according to a second preferred embodiment of the present invention.
Figure 10:
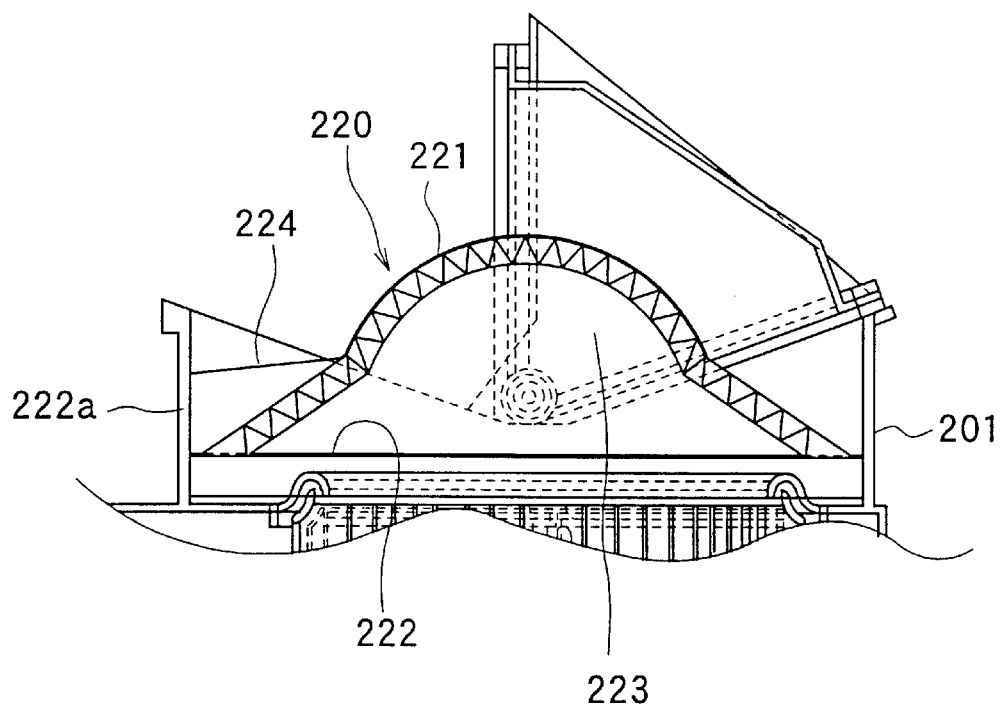
FIG. 10 is a schematic view showing a blower unit according to the second embodiment of the present invention.

A second preferred embodiment of the present invention will be now described with reference to FIGS. 9 and 10. In the second embodiment, as shown in FIG. 9, a part of the pedestal portion 222 is bent by an approximate right angle relative to a horizontal portion of the pedestal portion 222 to form a cover portion 222*a* (208). The cover portion 222*a* is used as a filter cover for opening and closing the filter-removable port 207. Therefore, in the second embodiment, the above-described pipe-like engagement members 225 can be omitted. As shown in FIG. 9, each one side end of the filter deformation strings 224 is fixed to the pedestal portion 222 at a side opposite to the cover portion 222*a*, and each the other side end thereof is fixed to the cover portion 222*a*.

According to the second embodiment of the present invention, when the filter 220 is removed from the casing 201, the cover portion 222*a* is drawn so that the cover portion 222*a* is displaced to be approximately placed on the same horizontal surface as the pedestal portion 222, and tension is applied to the filter deformation strings 224 with the movement of the cover portion 222*a*. Therefore, when the cover portion 222*a* opens the filter-removable port 207, the filter 220 is crushed to a plate like. Accordingly, crushing operation (deformation operation) of the filter 220 can be made simple, and the attaching/detaching performance can be improved.

A seal member such as a packing member can be attached between the cover portion 222*a* and the filter-removable port 207, and an engagement protrusion can be provided on the casing 201 to be engaged with the cover portion 222*a* when the cover portion 222*a* closes the filter-removable port 207. Thereby, it can prevent the cover portion 222*a* from being opened in a state where the filter 220 is attached into the casing 201.

Although the present invention has been fully described in connection with the preferred embodiments thereof with reference to the accompanying drawings, it is to be noted that various changes and modifications will become apparent to those skilled in the art.

For example, in the above-described first and second embodiments, both the filter deformation strings 224 are used for deforming the bent portion 221 of the filter 220. However, a single filter deformation string 224 can be used for deforming the bent portion 221 of the filter 220, or plural filter deformation strings 224 can be used. In addition, the other filter deformation member such as a wire or a rod member can be used.

In the above-described first and second embodiments, the present invention is typically used for the blower unit 200 having the rotary door 210. However, the present invention can be used for a filter device for filtering air in a casing having a small size. That is, when the bent portion 221 protrude in a predetermined direction, and when the filter-removable port for attaching and removing the filter 220 has a dimension smaller than the filter in the predetermined direction, the present invention can be suitably applied.

Such changes and modifications are to be understood as being within the scope of the present invention as defined by the appended claims.

What is claimed is:

1. An air conditioner comprising:
   a casing having an air opening through which air flows;
   a rotary door for opening and closing the air opening, the rotary door having both rotation shafts at both sides in an axial direction of the rotary door, and a door surface disposed at a position away from the rotation shafts by a predetermined dimension in a radial direction of the rotary door to be crossed with the radial direction; and
   a filter for cleaning air, the filter being detachably disposed inside the door surface, and having a bent portion protruding toward the door surface, wherein:
   the casing has a filter-removable port through which the filter is detachably attached into the casing; and
   the filter has a filter deformation member which is disposed to deform the bent portion of the filter to a flat shape.

2. The air conditioner according to claim 1, wherein the filter deformation member is a string-shaped member which is disposed to crush the bent portion when a predetermined tension is applied thereto.

3. The air conditioner according to claim 2, wherein:
   the bent portion is constructed by a corrugated filter element formed into a wave shape; and
   the string-shaped member is disposed to cross ridges of the corrugated filter element on the bent portion.

4. The air conditioner according to claim 3, wherein:
   the string-shaped member is constructed by both strings; and
   each of both the strings is disposed to cross the ridges of the corrugated filter element on the bent portion.

5. The air conditioner according to claim 2, wherein:
   the filter further has a flat pedestal portion for fixing the bent portion;
   a part of the pedestal portion is bent to form a cover member for opening and closing the filter-removable port;
   one end of the string-shaped member is disposed to be fixed to the pedestal portion, at a side opposite to the cover member; and
   the other end of the string-shaped member is disposed to be fixed to the cover member.

6. The air conditioner according to claim 5, wherein,
   when the cover member opens the filter-removable port of the casing, the string-shaped member crushes the bent portion; and
   when the cover member closes the filter-removable port of the casing, the bent portion substantially returns to an original shape before being crushed.

7. The air conditioner according to claim 5, wherein the bent portion is disposed on the pedestal portion to have an approximate semicylindrical shape.

8. The air conditioner according to claim 1, wherein the filter is disposed between both the rotation shafts.

9. An air conditioner for a vehicle having a passenger compartment, comprising:
   a casing for defining an air passage through which air is introduced toward the passenger compartment, the casing having an inside air introduction port from which inside air inside the passenger compartment is introduced, and an outside air introduction port from which outside air outside the passenger compartment is introduced;
   a rotary door for selectively opening and closing the inside air introduction port and the outside air introduction port, the rotary door having both rotation shafts at both sides in an axial direction of the rotary door, and a door surface disposed at a position away from the rotation shafts by a predetermined dimension in a radial direction of the rotary door to be crossed with the radial direction; and
   a filter for cleaning air, the filter being detachably disposed inside the door surface, and having a bent portion protruding toward the door surface, wherein:
   the casing has an filter-removable port through which the filter is detachably attached into the casing; and the filter has a filter deformation string which is disposed to crush the bent portion of the filter to a flat shape when a predetermined tension is applied thereto.

10. The air conditioner according to claim 9, further comprising:

a heat exchanger for adjusting temperature of air to be blown into the passenger compartment.

11. A filter device comprising:

a casing defining an air passage through which air flows; and a filter for cleaning air in the air passage, the filter being detachably disposed in the casing, and having a bent portion protruding toward one side in a predetermined direction, wherein:

the casing has an filter-removable port through which the filter is detachably attached into the casing;

the filter-removable port has a dimension in the predetermined direction, that is smaller than a dimension of the bent portion in the predetermined direction; and the filter has a filter deformation string which is disposed to deform the bent portion of the filter to a flat shape when a predetermine tension is applied.

12. The filter device according to claim 11, wherein the predetermined direction is a vertical direction.

13. The filter device according to claim 11, wherein:

the filter further has a flat pedestal portion for fixing the bent portion;

a part of the pedestal portion is bent to form a cover member for opening and closing the filter-removable port;

one end of the filter deformation string is disposed to be fixed to the pedestal portion, at a side opposite to the cover member; and the other end of the filter deformation string is disposed to be fixed to the cover member.

* * * * *